US010565287B2

(12) United States Patent
Bhageria et al.

(10) Patent No.: US 10,565,287 B2
(45) Date of Patent: Feb. 18, 2020

(54) WEB CONTENT LAYOUT ENGINE INSTANCE SHARING ACROSS MOBILE DEVICES

(71) Applicant: INTERNATIONAL BUSINESS MACHINES CORPORATION, Armonk, NY (US)

(72) Inventors: Gopal K. Bhageria, Kolkata (IN); Vijay Ekambaram, Tamilnadu (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 714 days.

(21) Appl. No.: 15/185,073

(22) Filed: Jun. 17, 2016

(65) Prior Publication Data
US 2017/0364242 A1 Dec. 21, 2017

(51) Int. Cl.
*G06F 17/21* (2006.01)
*G06F 16/957* (2019.01)
(Continued)

(52) U.S. Cl.
CPC ............ *G06F 17/212* (2013.01); *H04L 67/02* (2013.01); *H04M 1/72527* (2013.01)

(58) Field of Classification Search
CPC ... G06F 17/212; G06F 16/9577; G06F 16/954
See application file for complete search history.

(56) References Cited

U.S. PATENT DOCUMENTS 6,078,908 A 6/2000 Schmitz
6,300,947 B1 * 10/2001 Kanevsky ........... G06F 16/9577
715/866
(Continued)

OTHER PUBLICATIONS

Chi et al., "Enhancing Cross-Device Interaction Scripting with Interactive Illustrations," CHI '16 Proceedings of the SIGCHI Conference on Human Factors in Computing Systems, May 7-12, 2016, https://bid.berkeley.edu/files/papers/demoscript-camera-ready.pdf.*

(Continued)

*Primary Examiner* — Ryan Barrett
(74) *Attorney, Agent, or Firm* — Michael O'Keefe; Matthew M. Hulihan; Heslin Rothenberg Farley & Mesiti PC

(57) ABSTRACT

Web content layout engine instance sharing is provided by configuring a shared instance of a web browser layout engine shared between a first mobile device and a second mobile device; dynamically partitioning requested web content for display across the first mobile device and the second mobile device using the shared instance of the web browser layout engine, where the dynamically partitioning selects first interface element(s) of the web content for display by the first mobile device and selects second interface element (s) of the web content for display by the second mobile device, and where at least one second interface element of the second interface element(s) includes an action interface element, interaction with which is configured to advance a workflow of which the web content is a part; determining, based at least in part on user input, whether to advance the workflow; and performing processing based on the determining.

20 Claims, 6 Drawing Sheets

(51) Int. Cl.
  *G06F 16/954* (2019.01)
  *H04L 29/08* (2006.01)
  *H04M 1/725* (2006.01)

(56) References Cited

U.S. PATENT DOCUMENTS

| | | | | |
|---|---|---|---|---|
| 6,857,102 | B1* | 2/2005 | Bickmore | G06F 17/2247 715/205 |
| 7,849,135 | B2 | 12/2010 | Agrawal et al. | |
| 9,578,083 | B1 | 2/2017 | Jaini et al. | |
| 9,947,367 | B2* | 4/2018 | Samra | G06F 17/241 |
| 2002/0065912 | A1* | 5/2002 | Catchpole | H04L 29/06 709/224 |
| 2003/0229900 | A1* | 12/2003 | Reisman | G06F 16/954 725/87 |
| 2004/0031856 | A1* | 2/2004 | Atsmon | G06F 21/34 235/492 |
| 2004/0123157 | A1* | 6/2004 | Alagna | G06F 21/606 726/8 |
| 2004/0201628 | A1* | 10/2004 | Johanson | G06F 3/023 715/764 |
| 2007/0250365 | A1 | 10/2007 | Chakrabarti et al. | |
| 2008/0266323 | A1* | 10/2008 | Biocca | G06F 3/014 345/633 |
| 2009/0089565 | A1* | 4/2009 | Buchanan | G06F 15/16 713/1 |
| 2009/0164581 | A1* | 6/2009 | Bove | G06F 16/954 709/205 |
| 2009/0172565 | A1* | 7/2009 | Jackson | H04L 67/1095 715/753 |
| 2010/0267362 | A1* | 10/2010 | Smith | G06Q 20/12 455/407 |
| 2011/0276706 | A1 | 11/2011 | Chene et al. | |
| 2013/0073853 | A1* | 3/2013 | Ford | H04L 63/1466 713/168 |
| 2014/0053054 | A1 | 2/2014 | Shen et al. | |
| 2014/0136481 | A1* | 5/2014 | Quan | H04W 4/023 707/617 |
| 2014/0173032 | A1* | 6/2014 | Kruglick | H04L 67/2823 709/217 |
| 2014/0207559 | A1* | 7/2014 | McCord | G06Q 30/0242 705/14.41 |
| 2014/0281896 | A1* | 9/2014 | Wiitala | G06F 17/2247 715/234 |
| 2015/0002676 | A1* | 1/2015 | Yoo | G02B 27/017 348/159 |
| 2015/0100621 | A1 | 4/2015 | Pan | |
| 2015/0153928 | A1 | 6/2015 | Chen et al. | |
| 2015/0338915 | A1* | 11/2015 | Publicover | G06K 9/0061 345/633 |
| 2015/0365300 | A1* | 12/2015 | Kruglick | H04L 67/34 715/738 |
| 2016/0098093 | A1* | 4/2016 | Cheon | G06F 3/0484 345/156 |
| 2016/0127444 | A1* | 5/2016 | Singh | G06F 16/986 709/203 |

OTHER PUBLICATIONS

Chen et al., "Duet: Exploring Joint Interactions on a Smart Phone and a Smart Watch", CHI 2014, One of a CHInd, Session: Watches and Small Devices, pp. 159-168.

Houben et al., "WatchConnect: A Toolkit for Prototyping Smartwatch-Centric Cross-Device Applications", 10 pages.

How Browsers Work, http://taligarsiel.com/Projects/howbrowserswork1.htm, 24 pages.

\* cited by examiner

WEB CONTENT LAYOUT ENGINE INSTANCE SHARING ACROSS MOBILE DEVICES

BACKGROUND

Users utilize mobile devices to perform many different tasks, such as online transactions and workflow approvals. Some tasks require correct user credentials. A user may save a password in the mobile device, e.g. an application thereof, for convenience or other reasons. However, if the mobile device is lost and acquired by another person, this leaves the saved password susceptible to attack and gives the other person the ability to perform tasks in the name of the user. At the same time, if the other person is close to the user or otherwise has access to personal information about the user, the other person has a higher likelihood of guessing the user's password and gaining unauthorized access to the mobile device.

SUMMARY

Shortcomings of the prior art are overcome and additional advantages are provided through the provision of a computer-implemented method that includes configuring a shared instance of a web browser layout engine shared between a first mobile device and a second mobile device; dynamically partitioning requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements includes an action interface element, interaction with which is configured to advance a workflow of which the web content is a part; determining, based at least in part on user input, whether to advance the workflow; and performing processing based on the determining.

Further, a computer program product including a computer readable storage medium readable by a processor and storing instructions for execution by the processor is provided for performing a method that includes: configuring a shared instance of a web browser layout engine shared between a first mobile device and a second mobile device; dynamically partitioning requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements includes an action interface element, interaction with which is configured to advance a workflow of which the web content is a part; determining, based at least in part on user input, whether to advance the workflow; and performing processing based on the determining.

Yet further, a computer system is provided that includes a memory and a processor in communications with the memory, wherein the computer system is configured to perform a method including: configuring a shared instance of a web browser layout engine shared between a first mobile device and a second mobile device; dynamically partitioning requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements includes an action interface element, interaction with which is configured to advance a workflow of which the web content is a part; determining, based at least in part on user input, whether to advance the workflow; and performing processing based on the determining.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
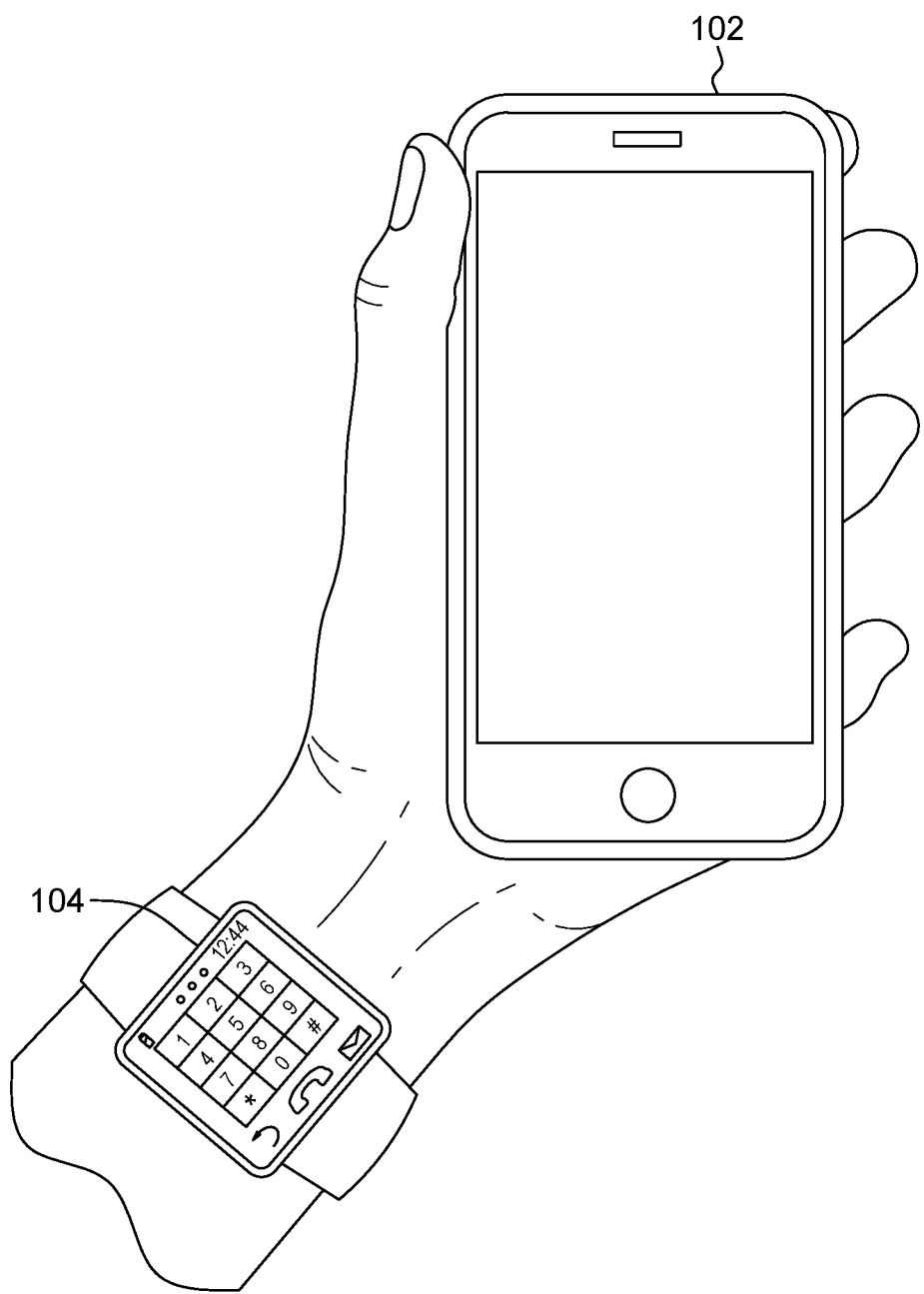
FIG. 1 depicts an example usage of first and second mobile devices by a user.

In addition to risks outlined above, unauthorized access to a mobile device may also defeat the two-factor authentication approach taken to authenticate with some online services. The two-factor authentication approach often times assumes that the mobile device is in the possession of the legitimate user. A text message or unique code delivered to the mobile device for use as the second layer in the two-factor authentication is assumed to be viewed and used by only the legitimate user. If a hacker or other unauthorized user is in possession of the mobile device with saved passwords of many apps and websites for which two-factor authentication is configured, and has access to read, e.g., the SMS messages of the mobile device, the unauthorized user may be able to easily hack many of those services.

Described herein are facilities for secure multi-device based workflow execution by sharing an instance of a web browser layout engine to partition web content, such as a web page, through selective rendering of the web content across user devices. In some examples, the web content interface elements that are actionable to advance a workflow, such as a Submit button, Login button, or Confirm Purchase button, as examples, are displayed in one mobile device of the user while other web content interface elements (such as non-actionable interface elements, or those that do not advance a workflow when interacted-with), are displayed in another mobile device of the user.

By way of specific example, an example web browser layout engine is the WebKit open source web browser engine available at webkit dot org. A web browser layout engine is a software component for rendering web content (e.g. pages) in web browsers and/or hybrid applications. Example hybrid applications are mobile apps that are built at least in part on one or more web technologies, such as Java or HTML, and leverage the operating system's engine for displaying web content. In contrast to web browser apps, hybrid apps typically have a specific purpose aside from merely rendering web pages.

In some embodiments, a shared instance of a web browser layout engine is configured for sharing between first and second mobile devices of a user. An example such mobile device is a wearable mobile device, such as a smartwatch. Smartwatches have become much more common recently as a relatively low price wearable mobile device option. Example smartwatches are the Samsung Gear™ line of products offered by Samsung Group, Suwon, South Korea and the Apple Watch® line of products offered by Apple Inc., Cupertino, Calif., U.S.A. (GEAR and APPLE WATCH are trademarks of Samsung Group and Apple Inc., respectively). Multi-device based workflow execution and security is enhanced by aspects described herein in a user-friendly manner by sharing a WebKit or other web browser layout engine instance across mobile devices, such as across a smartphone and a smartwatch.

A plurality of mobile devices may be synched by configuring and sharing a common layout engine instance between the plurality of devices for enabling a secure workflow. As an example, whenever a user requests web content, such as by opening a web-page or hybrid app screen on a first mobile device, such as a smartphone, aspects described herein determine actionable and non-actionable interface elements of the requested and received web content and selectively renders the content, e.g. the web page, such that action/executable interface elements (i.e. buttons to advance a workflow) are displayed in a second mobile device, such as a smartwatch, while other interface elements of the web content are displayed on the first mobile device.

The first mobile device, or "primary" mobile device as sometimes referred to herein, may be the one through which the web content is requested. For instance, the primary mobile device may be the mobile device in which the user launches a web browser or hybrid app and requests the web content. If the primary mobile device is lost, then a hacker or other unauthorized person may be unable to use the mobile web browser and/or hybrid apps of the lost mobile device to execute, perform, or advance a workflow, as the unauthorized user will not have actionable interface elements displayed on the primary mobile device when web content is requested. The unauthorized user would have to also acquire the second mobile device ("secondary" device) to work with the mobile browser/apps. Thus, the workflow is made more secure than existing techniques during the event of a lost primary mobile device. Consequently, aspects described herein can help secure a mobile application even if the mobile device is stolen or compromised and the acquiring person has full access to the application and the owner's credentials to authenticate with a web service.

An example overview of a shared web content layout engine approach as described herein is now provided in the context of a primary mobile device (e.g. a smartphone) and a secondary mobile device, e.g. a smartwatch.

To execute a given workflow, the user uses the smartwatch and the smartphone together in one hand. Another hand is to be used for navigation, e.g. inputting user input to advance a workflow. Software installed in both mobile devices can detect that a common user is using these devices in a paired/shared manner to execute a given workflow. Though in this example the primary and secondary devices are a smartphone and a smartwatch, it is noted that the first and second mobile devices need not necessarily be a smartphone and a smartwatch. Either mobile device may be any type of mobile device, examples of which are smartphones, personal digital assistants, tablets, wearable devices ("wearables"), portable gaming consoles or other media players, and personal navigation devices, though other example types of mobile devices exist.

The smartwatch and/or smartphone (in this example) configures a shared layout engine instance. The WebKit layout engine is used in examples described herein, though aspects described herein apply to other layout engines. In one example, an owner of the two devices enters a master password in one or both of the smartwatch or the smartphone and enables a shared web content display mode where the instance of the layout engine is shared between the devices so that web content can be rendered across the devices. In some examples, this is provided as a system/device-level setting that applies generally to any device application that utilizes the layout engine. In other examples, the setting is provided as part of a browser or hybrid application, and enabled by a plugin or other component of such application. In such an example, the sharing of a layout engine instance may be enabled across platforms, even in non-platform browsers. An example such configuration is the Chrome browser installed on an iOS device (CHROME and IOS are trademarks of Google Inc., Mountain View, Calif., U.S.A., and Apple Inc. respectively). The plugin approach can be leveraged to enable sharing to another Chrome browser in another mobile device, regardless of the platform on which each Chrome browser runs. As long as the appropriate plugin to enable the sharing is installed in the Chrome (in this example) instance on each device, sharing of the layout engine may be enabled.

If the shared web content display mode is enabled, then when the user of the mobile devices opens web content, e.g. a web-page or screen, in an application such as a web browser or hybrid app, some interface element(s), such as the action/executable interface elements, can be displayed in the smartwatch, and other element(s) of the web content can be displayed in the smartphone. The web content may be dynamically partitioned, and may be content of a single web page or collection of elements for simultaneous display. Using this dynamic web-page partitioning, the user interacts with the smartwatch and/or both mobile devices to complete or advance a workflow.

If the primary device becomes lost when the shared engine instance mode is enabled, the party who finds the primary device may be unable to use any apps configured for shared instance display to perform a workflow. This is because certain interface elements, e.g. ones with which the party would need to interact to advance the workflow, may be rendered on the secondary device and unless the party also has access to the secondary device, the party will be unable to interact with those interface elements.

If the shared layout engine mode is disabled or not currently active, the standalone web content display mode is utilized in which the user will see the complete web content on, e.g., the primary mobile device. The shared layout engine may be enabled by default, for security reasons. This is not expected to cause significant inconvenience to the user when the secondary mobile device is one that the user is expected to keep close most of the time, as is usually the case with a smartwatch secondary mobile device.

Once the shared layout engine instance mode is enabled, the disabling of that mode to enter the standalone display mode may be controlled. For instance, the disabling may proceed only when the first and second devices are within some proximity (e.g. a few feet) of each other. Otherwise, the shared mode may not be disabled. Additionally or alternatively, the disabling may be controlled via a requisite exchange of security certificate(s) or other tokens between the two devices, which may be premised on some near-range communication such as Bluetooth® (BLUETOOTH is a registered trademark of Bluetooth SIG, Inc., Kirkland, Wash., U.S.A.). Additionally or alternatively, the user may be able to disable the shared mode on each device by supplying a master password to the respective device. This approach may be useful in case the user loses one of the paired, instance-sharing devices and wants to browse web content in the standalone mode on the other device.

The determination that a workflow is presented in web content and the identification of the flow of events in that workflow may be made using any desired approach. The approach can identify appropriate interface element(s) such as action button(s) to provide and display on the smartwatch. This determination of the interface elements could be rule-based. A system, e.g. one of the mobile device and/or a remote computer system, may determine the web content element(s) that would lead the workflow to continue to a next step. Example interface elements include buttons or menus. These action elements may be moved for display on the secondary device. As a specific example, all action interface elements (buttons) in a current frame with which the user is interacting may be displayed on the smartwatch. Additionally or alternatively, many interface elements, not all of which are to be displayed on the smartwatch, may be provided to the smartwatch but then isolated for display on the smartwatch. An example approach crops the desired interface element(s) to display on the smartwatch. There could be various other heuristics to select the action buttons to display in smartwatch. It is seen that one or more interface elements may be displayed on the second mobile device and not the first mobile device. For a webpage having both login and signup capabilities, for instance, both the login and signup buttons may be moved to the smartwatch while non-action items such as a username input field, which does not itself advance the workflow to a next page, may be displayed on the primary device.

The appropriate user input to advance the workflow can be configured to be any desired input. For example, the user could configure one or more of the devices so that the only user input needed is selection of the action interface element on the second mobile device. Alternatively, the appropriate user input may be that the user is to touch both the first device and second device simultaneously, contemporaneously (overlapping timeframes during which they are touched), and/or within a particular range of time (e.g. 4 seconds). Advancement of the workflow may be dependent on other requirements, such as:

Tracking for a predefined amount of pressure applied to one or more of the devices in order to advance/execute the workflow;

Tracking for a minimum duration of eye focus when one of the devices is a smart glasses device (such as Google Glass offered by Google Inc., of which GLASS is a trademark). In one example, once the user focuses his/her eyes on a given location for a threshold duration of time, then the workflow may proceed or an appropriate action button for advancing the workflow may be displayed in the second device, which may be a smartwatch or the smart glasses;

Performing a finger-based gesture to execute/advance the workflow, where the user is to move his/her finger on each device to perform a predefined gesture; and/or Proximity between the devices, where a proximity check as between the devices is made and advancement of the workflow is dependent in part on the devices being within some predefined proximity of each other.

FIG. 1 depicts an example usage of first and second mobile devices by a user. In this example, a user holds first mobile device 102, a smartphone in this example. The user wears the second mobile device 104, a smartwatch in this example. The user performs a workflow using this configuration. In some examples, the user reverses or repositions the smartwatch 104 so that it faces the user's line of sight when the holds first mobile device 102 as shown in FIG. 1. Once the user reverses the watch to the other side of the user's wrist as shown in FIG. 1, the watch 104 and/or smartphone 102 configure a shared WebKit instance such that action/executable widget(s) (e.g. interface elements, such as buttons) will be displayed on the display of the watch 104, and other (e.g. non-actionable) widgets will be displayed on the display of the smart phone 102.

Figure 2:
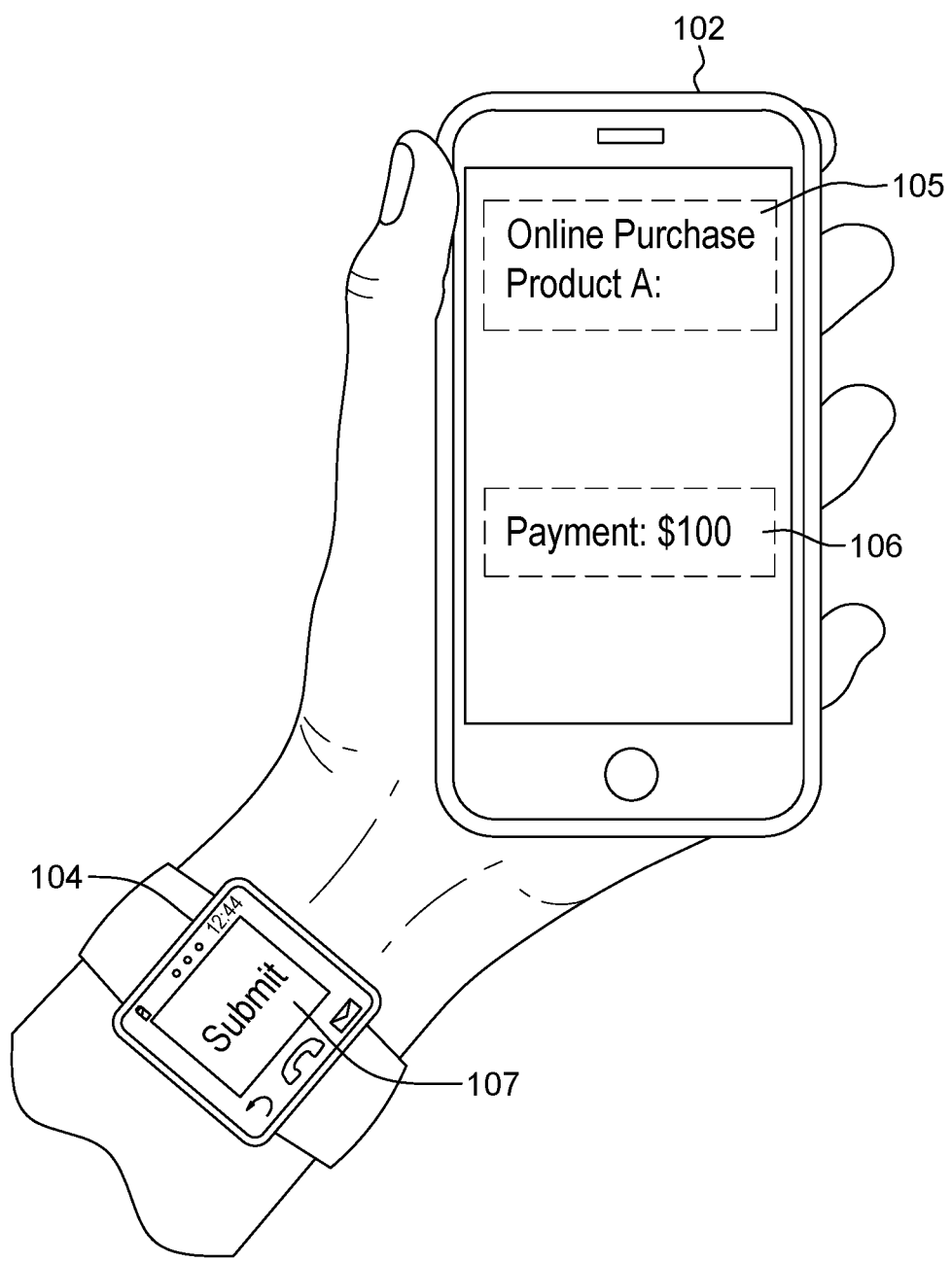
FIG. 2 depicts an example usage of a shared instance of a web browser layout engine to partition web content for display across the first and second mobile devices of FIG. 1, in accordance with aspects described herein.

FIG. 2 depicts an example usage of a shared instance of a web browser layout engine to partition web content for display across the first and second mobile devices of FIG. 1, in accordance with aspects described herein. This shows a user performing a workflow using with two devices 102 and 104. The smartphone 102 has the bigger display/screen, so the user is able to view more or larger content, such as the bulk of a web form or online application, as examples, than can be viewed on the smartwatch 104. As seen in FIG. 2, the user is purchasing a product ("Product A") online via the smartphone 102. The web content loaded as part of this workflow includes at least interface elements 105, 106 and 107. Interface elements 105 and 106 are non-actionable or non-interactive interface elements in that the user does not necessarily interact with them to advance the workflow of purchasing the product. Interface element 105 is an indication (text field, banner, image, etc.) of the purchase of product A. Interface element 106 is a text field indication of the amount of the payment in order to make the purchase. In this example, the execution/action Submit button is given by interface element 107 and is presented only in the smartwatch 104. This is because the smartphone 102 and smartwatch 104 share an instance of a web browser layout engine (e.g. WebKit instance) across these devices. The instance displays the web content including the interface elements depicted, but one or more computer system(s), such as device 102, 104, and/or another device dynamically partitions this web content for display across these devices. That is, the dynamic partitioning indicates that interface elements 105 and 106 are to be displayed by the shared instance on the smartphone and interface element 107 is to be displayed by the shared instance on the smartwatch.

Based on a rule specifying how a user can cause the workflow (the transaction to purchase the product in this example) to advance, a device responsible for managing the workflow session, such as the primary device (in this example the smartphone) can determine whether to advance the workflow and perform processing based on that determination. One example rule specifies that the user can activate the select/submit button 107 in smartwatch 104 using only a single touch directly the smartwatch 104. Another example rule specifies that the user is to touch both of the devices with two fingers. In the scenario where either device is an eyewear gadget or other smart glasses device, the user input could be the user focusing his/her gaze in a particular direction or to stare at a particular portion of a display of the device.

It is noted that, though not depicted in FIG. 2, there may be multiple different available devices that can act as the second mobile device with which the primary mobile device (102) pairs to share the WebKit instance. The user might utilize a smartwatch (104) during the workday and then a different wearable device, such as a fitness tracker with a display, after work while exercising. The particular secondary device selected for sharing the WebKit instance can vary depending on different selection criteria. In one example, both are selected as the secondary device, in which the interface element(s) for display on the second device are displayed on both the smartwatch and the fitness tracker and the user can interact with either set of interface element(s) for display on the second device. Alternatively, the user could specify which secondary device to use in a given scenario (which app on the primary device is managing the workflow session, time of day, location of the devices, proximity of the devices to each other or the primary device, a priority order in which the devices are to be used if available, etc.).

Various approaches are available regarding the dynamic partitioning of the requested web content. The dynamic partitioning can involve a determination of how to partition the web content for display across the devices. In the WebKit example, the rendering engine receives the requested web content (such as an HTML document) and parses the content, converting it to Document Object Model (DOM) elements that are organized in a tree relationship. A render tree is built by parsing style data from the web content and the engine performs layout and rendering processes to display web content elements. To incorporate aspects described herein to this process, the application in which the content is to be displayed (e.g. browser or hybrid app) and/or the layout engine implementation in the browser/hybrid app could be modified to support this. In some examples as noted above, the browser/hybrid app is modified by installing a plugin, though there are other ways to incorporate shared layout engine instance functionality as described herein.

The shared layout engine instance provides a shared web content display mode, an example of which sees the browser display of the primary device extended to display space in the secondary device. In this example, the primary device's browser extends its view space to the secondary device. The secondary device can have a view space that is attached to the view space of the master or controlling browser (e.g. the browser on the primary device). This can be achieved by customizing the browser stack, for instance. In some examples, the full browser display is mirrored to the secondary device but the particular interface elements to display on the secondary device are isolated by cropping, and then displayed on the secondary device, i.e. a display thereof.

In some approaches, the effective paint rendering area for the requested web content is extended to a view space on the secondary device. In the rendering of the render tree, the process determines the coordinates of where the interface elements/objects should be rendered. With customization or modification of a layout engine as described herein, the dynamically partitioning can identify a property or properties of the objects to be displayed, and the property can be indicative of whether the object is to be displayed on the primary device or the secondary device. Based on that indication, the rendering process can assign the coordinates of the object to coordinates that correspond to the view space of the primary device or the secondary device, as appropriate. Based on the assigned respective coordinates of the objects, objects are painted (as above). HTML object tags are example properties upon which the dynamically partitioning may determine the device on which to render the object and determine the coordinates to assign to it for rendering. In some examples, action buttons and/or java script elements are selected to render on the secondary device. Additionally or alternatively, various embodiments for partitioning the interface elements exist, for instance:

Based on events executed in the browser, hybrid app or webpage, a flow of upcoming or next events can be determined and accordingly appropriate action button(s) may be displayed on the appropriate device (e.g. secondary or primary), where non-action buttons may be displayed on the other of devices.

All buttons in the current frame with which the user is interacting will be displayed on the secondary device Button objects with specific tags (e.g. HTML tags) will be displayed on the secondary device The layout engine state may be customized to support these features. In one example, the customization includes the ability for the browser of the primary device to extend its view space to one or more other (i.e. secondary) devices, and the ability for the layouting of the render tree to be manipulated to change co-ordinates of dynamically selected elements to the secondary device view.

These modifications may be made to the layout engine of a browser, which engine may be a common component across browsers such that any browser having the proposed customized layout engine could implement aspects described herein. Since there is only a single rendering engine in this example, issues with respect to session, form management, etc. are managed automatically.

Secure workflow is enabled between a primary mobile device, such as a smartphone, and a secondary mobile device, such as a smartwatch, which can help prevent misuse of mobile applications and execution, advancing, and completion of workflows should the primary device be misplaced or stolen. This is accomplished by configuring and sharing a common web browser layout engine instance, e.g. a WebKit instance, between the two devices for enabling the secure work-flow. Under some scenarios depending on the configuration of the sharing, whenever a user opens a web-page or hybrid app screen on the primary device to request and display web content, aspects described herein dynamically determine and partition actionable and non-actionable interface elements of the web content for display on the devices, and selectively render the web content such that one or more action/executable elements, such as buttons, are displayed on the secondary device and other elements, perhaps all other interface elements of the web content, are displayed on the primary device.

Aspects described herein may be distinct from a practice of switching web interactions between devices. According to aspects described herein, a user may use both primary and secondary devices together that share a common WebKit instance that enables secure workflow between the two devices to, for instance, prevent misuse of mobile apps when the primary device is no longer in possession of the owner or other legitimate user.

Figure 3A:
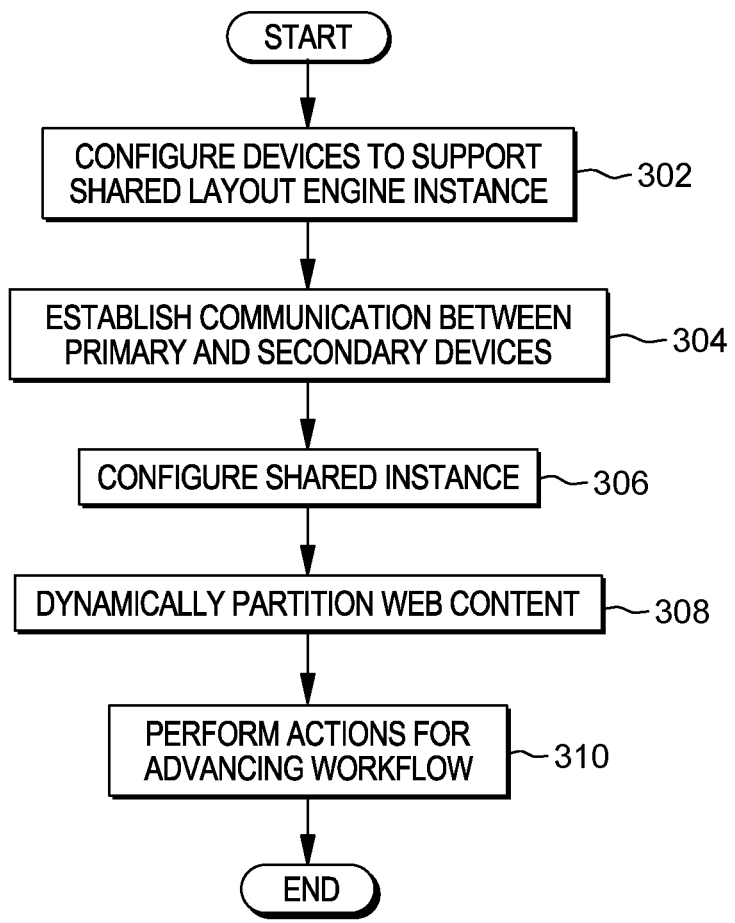
FIG. 3A depicts an example process for implementing and using a shared web content layout engine instance shared across mobile devices, in accordance with aspects described herein.

Accordingly, FIG. 3A depicts an example process for implementing and using a shared web content layout engine instance shared across mobile devices, in accordance with aspects described herein. The process begins by configuring the primary and secondary devices to support a shared layout engine instance (302). In one example, the user configures both a mobile phone and a smartwatch, so that software installed in the devices will understand how the workflow is to be executed. This configuration could be via a setting or plugin to the operating system of the respective device, or via an application to display web content on the device, such as a browser application or hybrid app.

The process continues by establishing communication between the primary and secondary devices (304). In some examples, this includes selecting a mobile device from plurality of mobile devices to be the secondary mobile device. The primary and secondary devices can communicate with each other while executing the subject workflow.

The process then configures a shared layout engine (e.g. WebKit) instance (306), such as based on the user providing a master password to one or both of the devices to enable the shared instance on both devices and dynamic partitioning of requested web content.

Based on events executed in the application and/or webpage on the primary device, the process then dynamically partitions requested web content (308). This can include determining the flow of events in the workflow and accordingly identifying any appropriate action buttons or other interface elements to be displayed on the secondary device. In one approach, many web content interface elements (such as those in a current frame in which the user is interacting) are provided to and display by the secondary device, while in other approaches, the secondary device may select or crop around the particular interface elements, of the many interface elements, that are to be displayed on the secondary device. In this manner, once a workflow is commenced, the action buttons to advance or further execute that workflow may be shown in only the secondary device and not the primary device, when the layout engine instance is being shared.

The process then continues by determining appropriate user input or other types of criteria for advancing the workflow, and then advancing that workflow or displaying an interface element to advance the workflow based on determining that such criteria are satisfied (310). For instance, if one or both of the devices is a smart glasses device, software installed in one or both can track the user's eye movement and register a desired input based on a sustained gaze at a particular direction or location. Other forms of appropriate user input include the user performing a hand or finger movement, gesture, or pattern. Other criteria may involve proximity of the devices or the ability for the devices to exchange security certificates or other tokens. Accordingly, software of one or more devices can identify that the user desires to advance the workflow and determine whether the criteria have been satisfied. If so, the workflow can advance, or in some embodiments an interface element for advancing the workflow may be revealed or rendered to enable the user to select that element.

Figure 3B:
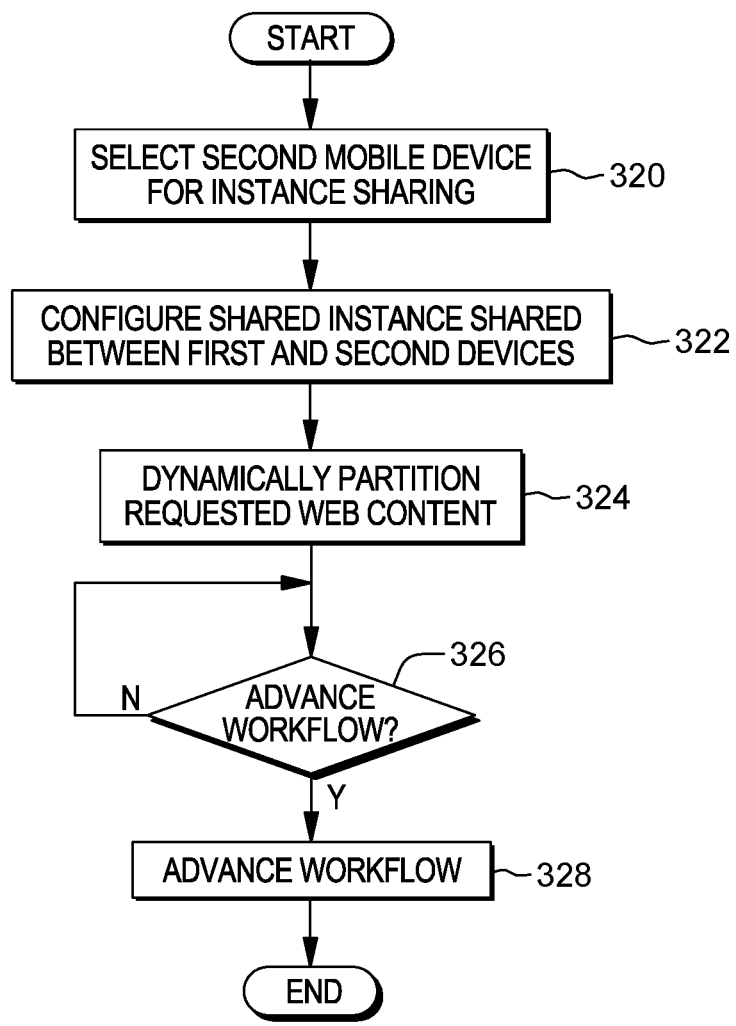
FIG. 3B depicts another example process for implementing and using a shared web content layout engine instance shared across mobile devices, in accordance with aspects described herein.

FIG. 3B depicts another example process for implementing and using a shared web content layout engine instance shared across mobile devices, in accordance with aspects described herein. In some examples, the process of FIG. 3B is performed by one or more computer system(s), such as a first (primary) mobile device, second (secondary) mobile device, a remote server in communication with the first and/or second mobile device, or a combination of the foregoing computer systems.

The process begins by selecting the second mobile device with which the first mobile device is to share the layout engine instance (320). The second mobile device may be selected from a plurality of second mobile devices with which the first mobile device is configured to share instances of the web browser layout engine. For instance, the user may own several second mobile devices that can simultaneously, independently and selectively share a layout engine instance with the first mobile device. In some examples, this selecting is based on selection criteria. The selection criteria can be any desired criterial to guide this selection. Example criteria are a time of day, a location of the first mobile device or the second mobile device, proximity of the first mobile device relative to each second mobile device of the plurality of second mobile devices (e.g. which is closest) and/or a priority in which the plurality of available second mobile devices are to be selected if available.

The process continues by configuring a shared instance of a web browser layout engine shared between the first mobile device and the second mobile device (322). This configuring can setup the mobile devices to receive and display partitioned web content, and in the case that one of the mobile devices performs dynamic partitioning (324), activate the performance of that dynamic partitioning on that mobile device.

The process then performs dynamically partitioning requested web content for display across the first mobile device and the second mobile device using the shared instance of the web browser layout engine (324). The dynamically partitioning can select one or more first interface elements of the web content for display by the first mobile device and select one or more second interface elements of the web content for display by the second mobile device. At least one second interface element of the one or more second interface elements can include or be an action interface element, interaction with which is configured to advance a workflow of which the web content is a part. For instance, the web content may be a web page having a button to submit or confirm something related to the workflow, or to login or sign-up for a service associated with the workflow.

In particular examples, the dynamically partitioning splits the web content into non-action interface elements and at least one action interface element for advancing the workflow. In this example, the one or more first interface elements can include the non-action interface elements and the one or more second interface elements can include the at least one action interface element. The partitioning may be based on tags applied to the one or more first interface elements and one or more second interface elements. In some examples, the interface element(s) to be displayed on the first device are input fields and text areas, and the interface element(s) to be displayed on the second device are actionable/interactive interface elements, interaction with which can advance a workflow to a next set of web content. it may be the case that only some action elements are displayed on the secondary device, while others remain for display on the primary device. An action interface element may be a button to confirm a submission or submit a form, for instance.

The dynamically partitioning can separate the one or more first interface elements from the one or more second interface elements and provide the one or more second interface elements to the second mobile device for display. As an alternative, the dynamically partitioning can provide all or a portion of the web content including a plurality of interface elements of the web content to the second mobile device, and the second mobile device can selectively display the one or more second interface elements by cropping-out (removing or otherwise refraining from displaying) other interface elements of the plurality of interface elements.

The layout engine can be a layout engine of/for a dedicated web browser app and/or a hybrid app of either or each mobile device. Accordingly, the first mobile device can display the one or more first interface elements in a dedicated web browser app of the first mobile device or a hybrid app, of the first mobile device, that incorporates the web browser layout engine. Additionally, the second mobile device can display the one or more second interface elements in a dedicated web browser app of the second mobile device or a hybrid app, of the second mobile device, that incorporates the web browser layout engine.

Continuing with the process of FIG. 3B, the process determines, based at least in part on user input, whether to advance the workflow (326). This determination can include determining whether user input is an appropriate user input for advancing the workflow. For instance, the appropriate user input can include a user-selection of the action interface element when displayed by the second mobile device together with a concurrent user-selection of an interface element of the one or more first interface elements when displayed on the first mobile device. Additionally or alternatively, the appropriate user input can include performance of one or more gestures (swipe gestures, motion gestures, facial gestures, etc.) to advance the workflow. In an example in which a mobile device sharing the instance is a smart glasses mobile device, the appropriate input may be the user staring in a particular direction and/or at a portion of a display of the smart glasses mobile device for a threshold duration of time. This can act as input to the device(s) that the user is selecting something, for instance selecting an interface element at which the user stares.

Processing may then be performed based on that determination of whether to advance the workflow. If the determination determines that the workflow is not to advance (326 "N"), the process can loop until it is decided to advance the workflow. Assuming it is determined at 326 to advance the workflow (326 "Y"), the process proceeds to advance the workflow (328). For instance, based on determining that the user input provided is the appropriate user input, the performing processing can include advancing the workflow and loading additional web content, such as a next page of the workflow.

The determination of whether to advance the workflow may be further based on other rules/criteria, such as whether the first mobile device and the second mobile device are within a predefined proximity of each other. The predefined proximity can be any desired proximity, such as 8 inches, 5 feet, or some other predefined distance. In this example, the performing processing can include advancing the workflow based on the first mobile device and the second mobile device being within the predefined proximity.

Another such rule/criteria for determining whether to advance the workflow may involve at least one security certificate that is to be exchanged between the first and second mobile devices in order to prove their authenticity and presents. The performing processing can include advancing the workflow based on the first mobile device and the second mobile device exchanging the at least one security certificate.

The configuration of the shared instance can configure the first mobile device and the second mobile device in a shared web content display mode. The devices may also be configured, simultaneously or alternatively, for a standalone web content display mode. In the standalone web content display mode, display of web content requested by a respective device of the first mobile device and the second mobile device is confined to the respective first mobile device or second mobile device. The process can include, based on configuring the first mobile device and the second mobile device in the shared web content display mode, then enforcing a rule that prevents at attempt to place the first mobile device and the second mobile device in the standalone web content display mode unless some condition or criteria is met, such as the first mobile device and the second mobile device being within a predefined proximity of each other. Enforcing the rule does not necessarily imply that the attempt is rejected—when the devices are within the predefined proximity, for instance, the rule is enforced (evaluated for action) but a switch to the standalone mode is permitted. If the condition/criteria are not met, then enforcing the rule can include rejecting the attempt to switch to the standalone display mode. This provides a high level of security to prevent unauthorized users from disabling the shared instance.

First and second mobile devices can each be any type of mobile device, and may be different types of mobile devices, examples of which include but are not limited to smartphones, personal digital assistants, tablets, wearable devices ("wearables"), portable gaming consoles or other media players, and personal navigation devices. In some specific embodiments, the first mobile device and/or second mobile device is a wearable mobile device. For instance, the first mobile device is a smartphone (or any other type of mobile device) and the second device is a smartwatch wearable device. As another example, the second device is or includes smart glasses, in which case user input may be provided via touch sensors, buttons, and/or user eyesight direction or eye behavior (blinking, etc.). In this manner, the user can provide user input by staring at interface elements, such as an action interface element, to select the interface element displayed by the mobile device and, in the case where the interface element is an action interface element, to advance the workflow.

Processes described herein may be performed singly or collectively by one or more computer systems, such as computer system(s) described below with reference to FIG. 4. In some embodiments, such a computer system may be or include the primary mobile device, secondary mobile device, and/or a remote cloud server in communication with these devices.

Figure 4:
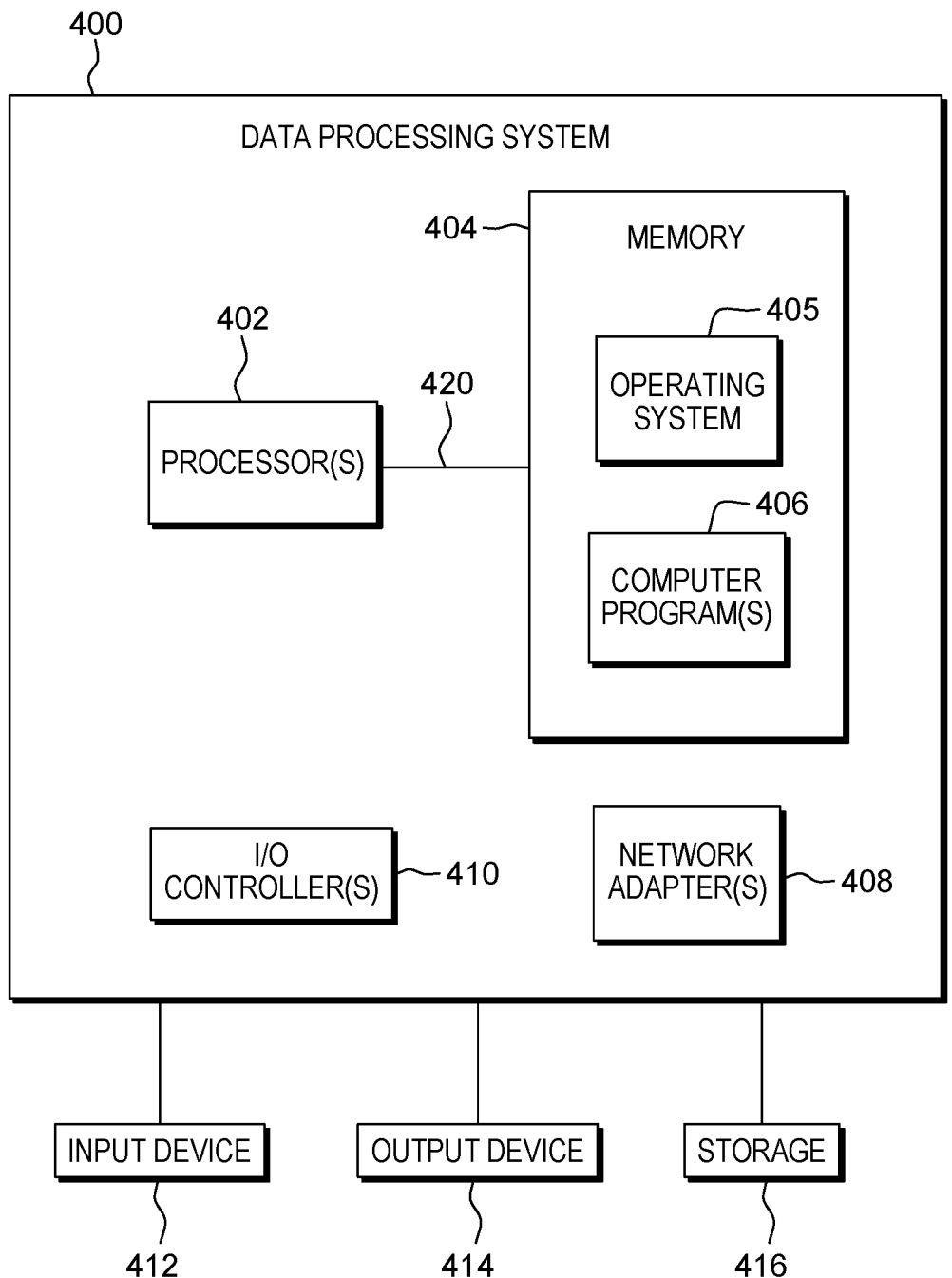
FIG. 4 depicts an example of a computer system to incorporate or use aspects described herein.

FIG. 4 depicts one example of a computer system to incorporate or use aspects described herein. A computer system may also be referred to herein as a data processing device/system or computing device/system, or simply a computer. Computer system 400 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance a web browser, hybrid app, web browser layout engine, and/or programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapter(s) 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer systems.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
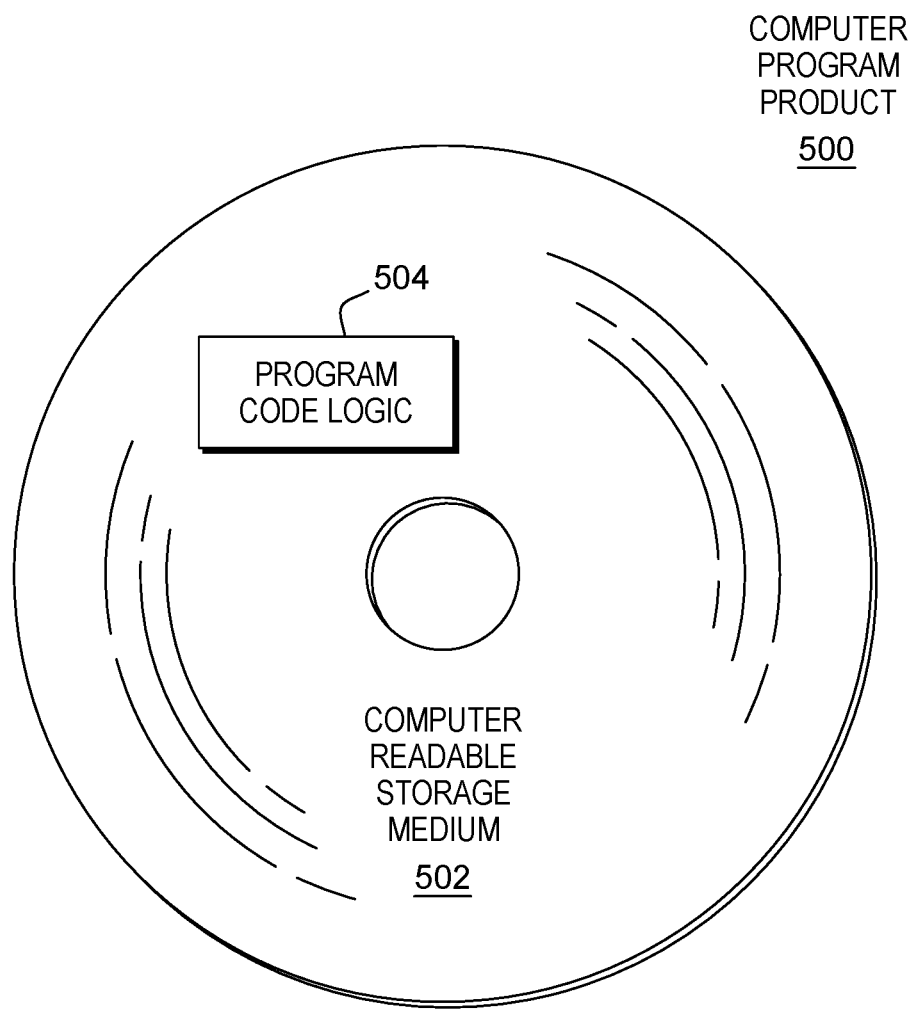
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

configuring a shared instance of a web browser layout engine shared between a first mobile device and a second mobile device, the first mobile device and the second mobile device each having installed software that detects that a common user is using the first mobile device and the second mobile device in a shared configuration having the shared instance of the web browser layout engine to execute a workflow of which requested web content is a part, and that selectively enables the shared instance of the web browser layout engine;

dynamically partitioning the requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements comprises an action interface element, interaction with which is configured to contribute at least in part to advancing the workflow;

determining, based at least in part on user input, whether to advance the workflow; and performing processing based on the determining.

2. The method of claim 1, wherein the action interface element comprises a button to confirm a submission or submit a form.

3. The method of claim 1, wherein the dynamically partitioning splits the web content into non-action interface elements and at least one action interface element for advancing the workflow, wherein the one or more first interface elements comprise the non-action interface elements and the one or more second interface elements comprise the at least one action interface element.

4. The method of claim 1, wherein the dynamically partitioning separates the one or more first interface elements from the one or more second interface elements and provides the one or more second interface elements to the second mobile device for display, or the dynamically partitioning provides a plurality of interface elements of the web content to the second mobile device and the second mobile device selectively displays the one or more second interface elements by cropping-out other interface elements of the plurality of interface elements.

5. The method of claim 1, wherein the determining whether to advance the workflow comprises determining whether the user input is an appropriate user input for advancing the workflow, the appropriate user input comprising a user-selection of the action interface element when displayed by the second mobile device together with a concurrent user-selection of an interface element of the one or more first interface elements when displayed on the first mobile device, and the performing processing comprises advancing the workflow and loading additional web content based on determining that the user input is the appropriate user input.

6. The method of claim 1, wherein the determining whether to advance the workflow comprises determining whether the user input is an appropriate user input for advancing the workflow, the appropriate user input comprising performance of one or more gestures to advance the workflow, and the performing processing comprises advancing the workflow and loading additional web content based on determining that the user input is the appropriate user input.

7. The method of claim 1, wherein the determining whether to advance the workflow is based further on at least one selected from the group consisting of:
(i) whether the first mobile device and the second mobile device are within a predefined proximity of each other, wherein the performing processing comprises advancing the workflow based on the first mobile device and the second mobile device being within the predefined proximity; and
(ii) at least one security certificate, wherein the performing processing comprises advancing the workflow based on the first mobile device and the second mobile device exchanging the at least one security certificate.

8. The method of claim 1, further comprising selecting the second mobile device from a plurality of second mobile devices with which the first mobile device is configured to share instances of a web browser layout engine, the selecting being based on selection criteria, wherein the selection criteria is selected from the group consisting of: (i) a time of the day, (ii) a location of the first mobile device or the second mobile device, and (iii) proximity of the first mobile device relative to each second mobile device of the plurality of second mobile devices.

9. The method of claim 1, wherein the configuring the shared instance configures the first mobile device and the second mobile device in a shared web content display mode, wherein the first mobile device and the second mobile device are also configured for a standalone web content display mode in which display of web content requested by a respective device of the first mobile device and the second mobile device is confined to the respective first mobile device or second mobile device, and where the method further comprises, based on configuring the first mobile device and the second mobile device in the shared web content display mode, enforcing a rule that prevents an attempt to place the first mobile device and the second mobile device in the standalone web content display mode unless the first mobile device and the second mobile device are within a predefined proximity of each other.

10. The method of claim 1, wherein the second mobile device is a wearable mobile device.

11. The method of claim 10, wherein the first mobile device is a smartphone and the second mobile device is a smartwatch wearable device.

12. The method of claim 1, wherein the second mobile device comprises smart glasses, wherein the user input comprises a user staring at the action interface element to select the action interface element displayed by the second mobile device to advance the workflow.

13. The method of claim 1, wherein the first mobile device displays the one or more first interface elements in a dedicated web browser app of the first mobile device or a hybrid app, of the first mobile device, that incorporates the web browser layout engine, and the second mobile device displays the one or more second interface elements in a dedicated web browser app of the second mobile device or a hybrid app, of the second mobile device, that incorporates the web browser layout engine.

14. The method of claim 1, wherein the configuring enables the shared instance of the web browser layout engine based on the user entering credentials on the first device that selectively enables the shared configuration.

15. The method of claim 1, wherein the configuring comprises the first mobile device and second mobile device communicating with each other to select which is to be the first mobile device to display the first interface elements and which is to be the second mobile device to display the second interface elements.

16. A computer program product comprising:
a computer readable storage medium readable by a processing circuit and storing instructions for execution by the processing circuit for performing a method comprising:
configuring a shared instance of a web browser layout engine shared between a first mobile device and a second mobile device, the first mobile device and the second mobile device each having installed software that detects that a common user is using the first mobile device and the second mobile device in a shared configuration having the shared instance of the web browser layout engine to execute a workflow of which requested web content is a part, and that selectively enables the shared instance of the web browser layout engine;
dynamically partitioning the requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements comprises an action interface element, interaction with which is configured to contribute at least in part to advancing the workflow;
determining, based at least in part on user input, whether to advance the workflow; and
performing processing based on the determining.

17. The computer program product of claim 16, wherein the dynamically partitioning splits the web content into non-action interface elements and at least one action interface element for advancing the workflow, wherein the one or more first interface elements comprise the non-action interface elements and the one or more second interface elements comprise the at least one action interface element.

18. The computer program product of claim 16, wherein the determining whether to advance the workflow is based further on at least one selected from the group consisting of:
(i) whether the first mobile device and the second mobile device are within a predefined proximity of each other, wherein the performing processing comprises advancing the workflow based on the first mobile device and the second mobile device being within the predefined proximity; and
(ii) at least one security certificate, wherein the performing processing comprises advancing the workflow based on the first mobile device and the second mobile device exchanging the at least one security certificate.

19. A computer system comprising:
a memory; and
a processor in communication with the memory, wherein the computer system is configured to perform a method, the method comprising:
configuring a shared instance of a web browser layout engine shared between a first mobile device and a second mobile device, the first mobile device and the second mobile device each having installed software that detects that a common user is using the first mobile device and the second mobile device in a shared configuration having the shared instance of the web browser layout engine to execute a workflow of which requested web content is a part, and that selectively enables the shared instance of the web browser layout engine;

dynamically partitioning the requested web content for display across the first mobile device and the second mobile device using the shared instance of the web browser layout engine, wherein the dynamically partitioning selects one or more first interface elements of the web content for display by the first mobile device and selects one or more second interface elements of the web content for display by the second mobile device, and wherein at least one second interface element of the one or more second interface elements comprises an action interface element, interaction with which is configured to a contribute at least in part to advancing the workflow;

determining, based at least in part on user input, whether to advance the workflow; and performing processing based on the determining.

20. The computer system of claim 19, wherein the determining whether to advance the workflow is based further on at least one selected from the group consisting of:

(i) whether the first mobile device and the second mobile device are within a predefined proximity of each other, wherein the performing processing comprises advancing the workflow based on the first mobile device and the second mobile device being within the predefined proximity; and (ii) at least one security certificate, wherein the performing processing comprises advancing the workflow based on the first mobile device and the second mobile device exchanging the at least one security certificate.

\* \* \* \* \*